(12) United States Patent
Marcon et al.

(10) Patent No.: US 8,027,532 B2
(45) Date of Patent: Sep. 27, 2011

(54) METHOD FOR RECOGNITION BETWEEN A FIRST OBJECT AND A SECOND OBJECT EACH REPRESENTED BY IMAGES

(75) Inventors: Marco Marcon, Bollate (IT); Davide Onofrio, Milan (IT)

(73) Assignee: Kee Square S.r.l., Milan (IT)

( * ) Notice: Subject to any disclaimer, the term of this patent is extended or adjusted under 35 U.S.C. 154(b) by 929 days.

(21) Appl. No.: 11/887,776

(22) PCT Filed: Mar. 17, 2006

(86) PCT No.: PCT/EP2006/002479
§ 371 (c)(1),
(2), (4) Date: Oct. 3, 2007

(87) PCT Pub. No.: WO2006/100000
PCT Pub. Date: Sep. 28, 2006

(65) Prior Publication Data
US 2009/0136095 A1 May 28, 2009

(30) Foreign Application Priority Data
Mar. 24, 2005 (IT) .............................. BG2005A0013

(51) Int. Cl.
*G06K 9/00* (2006.01)

(52) U.S. Cl. ........ 382/156; 382/118; 382/160; 382/190; 382/224; 382/260; 706/2; 700/48

(58) Field of Classification Search ........................ None
See application file for complete search history.

(56) References Cited

U.S. PATENT DOCUMENTS

| 2002/0054694 A1* | 5/2002 | Vachtsevanos et al. ....... 382/111 |
| 2002/0181785 A1* | 12/2002 | Gutta et al. ................... 382/225 |
| 2003/0002731 A1* | 1/2003 | Wersing et al. ............... 382/161 |
| 2003/0063795 A1* | 4/2003 | Trajkovic et al. ............. 382/159 |
| 2003/0063796 A1* | 4/2003 | Gutta et al. ................... 382/159 |
| 2003/0202704 A1* | 10/2003 | Moghaddam et al. ........ 382/224 |

OTHER PUBLICATIONS

Bazanov et al., "Hybrid Parallel Face Classifier Based on Artificial Neural Networks and Principal Component Analysis", Sep. 22, 2002, IEEE, vol. 2, pp. 916-919.*

Bazanov P et al:, "Hybrid and Parallel Face Classifier Based on Artificial Neural Networks and Principal Component Analysis", Proceedings 2002 International Conference on Image Processing. ICIP 2002. Rochester, NY, Sep. 22-25, 2002, International Conference on Image Processing, New York, NY : IEEE, US, vol. vol. 2 of 3, Sep. 22, 2002, pp. 916-919, XP010607474 ISBN: 0-7803-7622-6, The Whole Document.

(Continued)

*Primary Examiner* — John Lee
(74) *Attorney, Agent, or Firm* — Young & Thompson

(57) ABSTRACT

A method for recognition between a first and second object represented by at least one first image and at least one second image, includes defining rectangular assemblies of random pixels; filtering the first image with first n filters obtained from the assemblies of pixels to obtain n first filtered matrices; classifying the n first filtered matrices by providing a first center and a first radius within a space of N dimensions; filtering the second image with the first n filters to obtain n second filtered matrices; classifying the n second filtered matrices by providing a second center within the space of N dimensions; and comparing the first center and first radius with the second center.

20 Claims, 2 Drawing Sheets

OTHER PUBLICATIONS

Peter McGuire et al:, "Eigenpaxels and a Neural-Network Approach to Image Classification", IEEE Transactions on Neural Networks, IEEE Service Center, Piscataway, NJ, US, vol. 12, No. 3, May 2001, XP011039612, ISSN: 1045-9227, Cited in the Application, The Whole Document.

Moody J. et al: "Fast Learning in Networks of Locally-Tuned Processing Units", Neural Communication, 1989, pp. 281-294, vol. 1.

Jones R.D. et al: "Function Approximation and Time Series Prediction With Neural Networks", 1990, pp. 649-665.

Chen S. et al: "Orthogonal Least Squares Learning Algorithm for Radial Basis Function Networks", Mar. 1991, IEEE Transactions on Neural Networks, pp. 302-309, vol. 2, No. 2.

Fritzke, B.: "Radial Basis Function Networks According to Moody and Darken", 1997, Retrieved Jul. 25, 2011 from http://www.neuroinformatik.ruhr-uni-bochum.de/ini/VDM/research/gsn/FuzzyPaper/node5.html.

Buhmann M.D.: "Radial Basis Functions: Theory and Implementations", 2003, pp. 1-10, Cambridge University Press.

\* cited by examiner

US 8,027,532 B2

METHOD FOR RECOGNITION BETWEEN A FIRST OBJECT AND A SECOND OBJECT EACH REPRESENTED BY IMAGES

TECHNICAL FIELD

The present invention relates to a method for recognition between a first object and a second object both represented by an image containing a plurality of pixels. In particular, it relates to a method for recognizing the faces of individuals.

More particularly, it relates to a method for decomposing, classifying and recognizing the face of an individual within a data bank of several individuals.

PRIOR ART

Biometric systems for facial recognition currently represent one of the principal tools of safety systems, with the formation of effective systems able to offer reliability and rapidity of recognition acquiring ever increasing importance.

Particular importance is placed on the fact that these systems must be able to operate with little collaboration by the user and have the capacity to remain stable even when faced with considerable environmental variations (variations in light, background, etc.).

DISCLOSURE OF THE INVENTION

An aim of the present invention is provide a method of the aforesaid type which is of simple and effective application.

This and further aims are attained according to the present invention by a method for recognition between a first object and a second object represented by at least one first image and at least one second image, each containing a plurality of pixels, comprising the following steps: defining a plurality of rectangular assemblies of random pixels; filtering said first image with the first n filters obtained from said rectangular assemblies of pixels to obtain n first filtered matrices; classifying said n first filtered matrices by providing a first centre and a first radius within a space of N dimensions, for each of said n first filtered matrices; filtering said second image with the first n filters obtained from said rectangular assemblies of pixels to obtain n second filtered matrices; classifying said n second filtered matrices by providing a second centre within said space of N dimensions, for each of said n second filtered matrices; comparing said first centre and said first radius of each of said first filtered matrices with said second centre for each of said n second filtered matrices; considering that recognition between said first object and said second object has taken place if at least one said second centre lies at a distance from said first centre which is less than or equal to at least one said first radius. Further characteristics and advantages of the invention are described in the independent claims.

BRIEF DESCRIPTION OF THE DRAWINGS

The characteristics and the advantages of the present invention will be apparent from the ensuing description of one embodiment thereof, illustrated by way of non-limiting example in the accompanying drawings, in which.

BEST MODE FOR CARRYING OUT THE INVENTION

Figure 1:
FIG. 1 shows the first 15 autopaxels of dimensions 8×8 pixels relative to the 15 major autovalues positioned in decreasing order from left to right.

Grey images and tones will be used exclusively hereinafter, hence the term "image" will refer to a two-dimensional function $f(x,y)$ where x and y are the spatial coordinates and the value of f at each point $(x,y)$ is proportional to the luminosity or level of grey of the image at that point.

Digital images are images in which the spatial dimensions and the luminosity both have discrete values, and can hence be considered as a matrix in which each row and column identifies a point in the image, the corresponding value of the matrix element identifying the grey value of the image.

Each constituent element of the image matrix is commonly known as a pixel.

A paxel is defined as a rectangular assembly of pixels of an image, hence from the previous definition a paxel is a rectangular submatrix of the original matrix of the digital image.

Paxels of square dimension will be used in this description.

The grey values of each paxel can be aligned within a single x column matrix. If the paxel contains $N = n \times n$ pixels, the dimensions of x are $N \times 1$.

Considering a random assembly of paxels cut in completely random positions from each of the images used for the classification, an analysis will be made of the correlation matrix:

$$\Phi = E\{(x-\bar{x})(x-\bar{x})^T\}$$

where E is the expected value of the element enclosed within the square brackets.

$\bar{x}$ is the mean value of the vector x.

The correlation matrix $\psi$ is symmetrical and, with the exception of pathological cases, is defined as positive. It can therefore be decomposed into its eigenvalues and autovectors. This decomposition, as described in the text of Marcus, M. and Mine, H.: "Introduction to Linear Algebra", New York: Dover, p. 145, 1988, enables the covariance matrix to be diagonalized to obtain an orthonormal spatial basis. The vectors which constitute the basis of this space are defined as eigenvalues, which in our specific case will be known as autopaxels. An important consideration relates to the spatial frequency behaviour of the autopaxels by considering the relative eigenvalues in decreasing order: these behave as two dimensional orientated band-pass filters, the autovalue indicating the importance of each paxel compared with the others for the considered assembly of images. This method removes the correlation between the components of any paxel and is commonly known as the "method of principal components". The filters are obtained in this manner.

For more details, see the article of Peter McGuire e G. M. T. D'Euterio, "Eigenpaxel and neural-network approach to image classification", IEEE Transactions on Neural Networks, Vol. 12, n. 3, May 2001.

By diagonalizing the correlation matrix $\phi$ we obtain:

$$\Phi = UDU^T$$

where D represents the matrix with the eigenvalues placed in decreasing order and U represents for each column an eigenvector of the matrix $\phi$.

If the described method is applied to an 8×8 paxel linearized into x vectors of 64 elements, we obtain a 64×64 matrix for $\phi$.

The decomposition produces 64 eigenvalues and the relative 64 eigenvectors each of 64 elements which, when reorganized into 8×8 matrices, provide the relative autopaxels. FIG. 1 shows the first 15 autopaxels corresponding to the 15 highest eigenvalues.

Even using paxels of different dimensions the resultant autopaxels have a similar structure which repeats the same scheme.

Having obtained the autopaxels, the face image is preferably decomposed to obtain an effective dimensionality reduction.

The final aim of the decomposition proposed below is to find a decomposition on a subspace which allows efficient discrimination between different persons using the Radical Basis Function (RBF) neural network described below.

Figure 2:
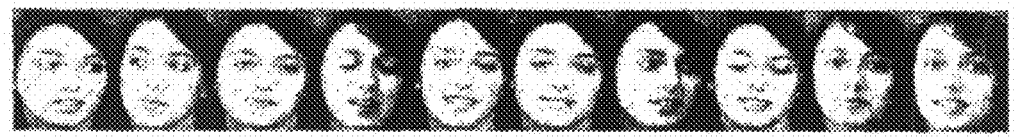
FIG. 2 shows an example of ten sample images for a subject
Figure 3:
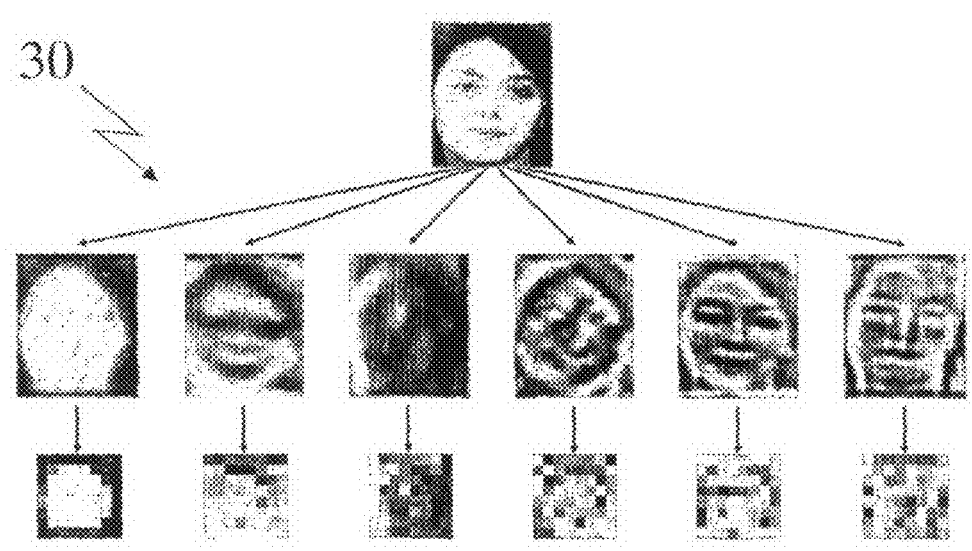
FIG. 3 shows a decomposition of an image using the first 6 autopaxels, each image then being reduced to an 8×8 pixel format.

Grey tone images of 92×112 pixels with a resolution of 8 bits (256 grey tones) were considered. FIG. 2 shows the 10 representations for a subject provided by the archives of AT&T Laboratories, Cambridge. The dimensionality reduction process consists of filtering each image with, for example, the first 6 eigenpaxel (associated to the 6 highest eigenvalues) to hence obtain six filtered images 30, as shown in FIG. 3, these images then being reduced in dimensions or rescaled [[at]] 31 to an 8×8 format by bilinear interpolation. Bilinear interpolation means a linear interpolation along both the coordinate axes (horizontal and vertical) of the image. In this case the grey value at a specific point is evaluated as a linear combination of the grey values of the four points closest to it. Assuming that the value of the function f(x,y) is to be evaluated for $$n_1T_1=x=(n_1+1)T_1 \text{ e } n_2T_2=y=(n_2+1)T_2$$

The value of the interpolated function $f_c(x,y)$ by the bilinear interpolation method is:

$$f_c(x,y)=(1-\Delta_x)(1-\Delta_y)f(n_1,n_2)+(1-\Delta_x)\Delta_y f(n_1,n_2+1)+\Delta_x(1-\Delta_y)f(n_1 1,n_2)+\Delta_x\Delta_y f(n_1 1,n_2+1)$$

where $\Delta_x=(x-n_1T_1)/T_1$ and $\Delta_y=(y-n_2T_2)/T_2$

The image filtering and resealing operation can be interpreted as the projection of the image on 6 ad-hoc subspaces, enabling an effective dimensionality reduction to an 8×8 format. To proceed to correct classification of each subject, 6 RBF neural networks were used (one for each filter used), each of these being instructed with 5 images (specifically between 4 and 7) of each subject with the specific filter of the neural network used. The radial basis function neural networks, such as described for example in Powell, M. J. D., 1988. "Radial basis function approximations to polynomials", Numerical Analysis 1987 Proceedings, pp. 223-241, Dundee, UK, are of particular interest, being universal approximators as they achieve an optimal generalization of that learnt in the instruction stage, and have a compact topology enabling effective subdivision of the considered space.

Moreover their learning rate, in terms of instruction cycles, is very rapid as the influence of each neuron can be regulated locally. In our process the RBF neural networks are used as the classifier for image recognition. The RBF neural networks subdivide a generic N-dimensional space into different zones (or hyperspheres) characterised by the neurons pertaining to the same category and by the extinction radius (or radius of influence) of each neuron. A neuron category is the "label" assigned to each neuron; in our case the category is the identity of each individual person with whom the neural network has been instructed, each zone being identified by the different representations of that same person deriving from the different images used in the instruction stage.

Figure 4:
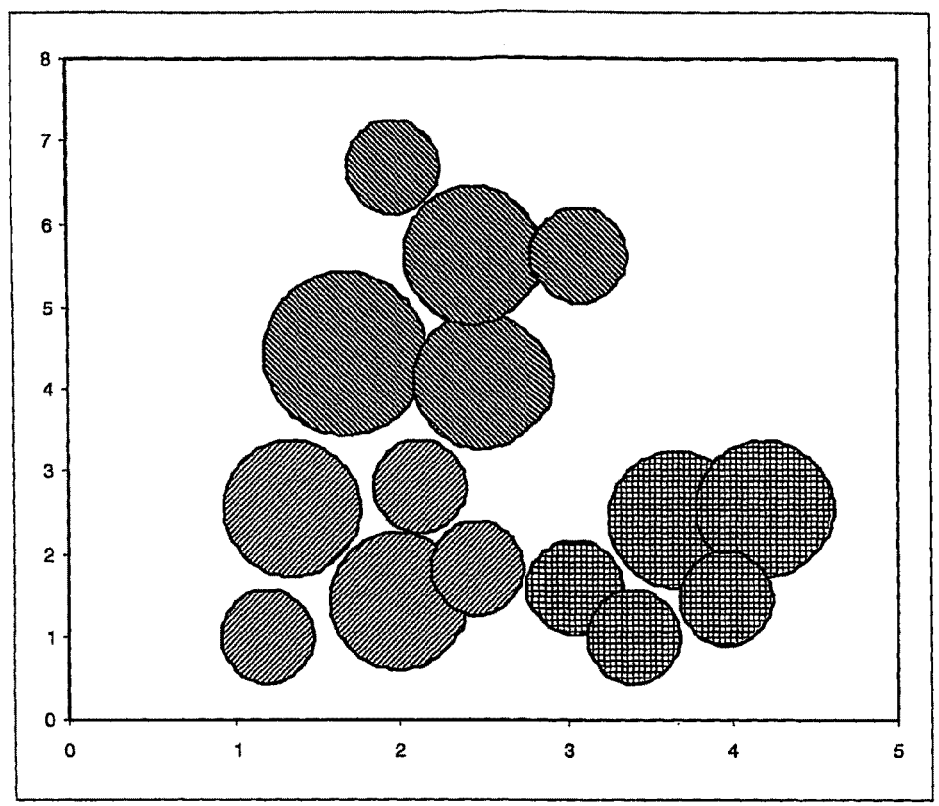
FIG. 4 shows a subdivision of a two-dimensional space of three groups of five images by an RBF neural network.
Figure 5:
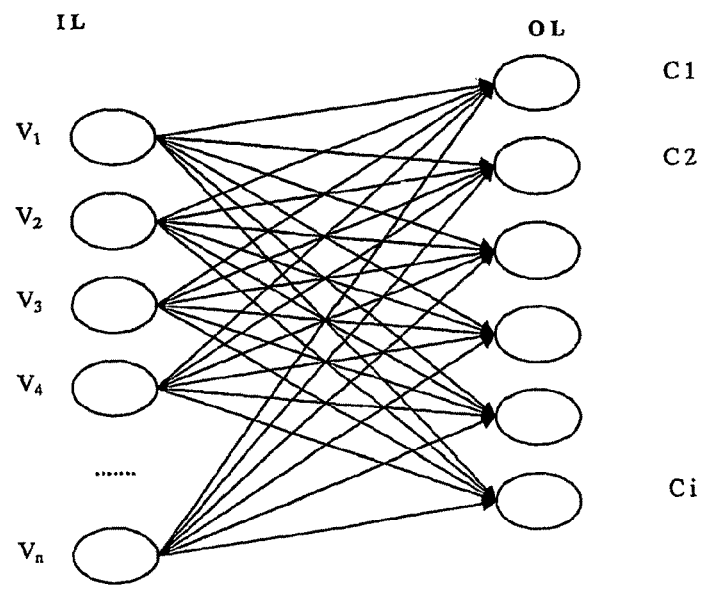
FIG. 5 shows a topology of an RBF neural network.

Hence within each zone there can be several neurons pertaining to the same category (i.e. the same person), each of which is described by a centre (vector within N-dimensional space) and by a radius of influence which indicates the extension of the neuron within the space considered. FIG. 4 shows a subdivision of a two-dimensional space by neurons pertaining to 3 different categories (represented by different outlines). The spheres of influence of the different neurons pertaining to the same category can be partly superimposed; this allows better covering of the space identified by the different categories, hence each person is assigned a zone within this N-dimensional space which uniquely identifies the person's identity. The RBF network generally consists of three layers of neurons: the input layer in which each node, which corresponds to a characteristic component of the face considered, is connected to all the nodes of the second layer; the hidden layer, in which each node is connected to an exit node corresponding to the label assigned to the neuron. The RBF neural network used in this invention, of which an example is shown in FIG. 5, differs from traditional networks in that there are no intermediate layers, there being only an input layer IL which connects the characteristic components of the considered image directly to the neuron of the output layer OL, the radius of each neuron determining with sharp transition its pertaining or non-pertaining to a category Ci-Cj, hence any vector of the N-dimensional space which does not lie within the hypersphere defined by any neuron is catalogued as not pertaining to any category.

The inputs $VrV_n$ of the neural network are hence the 64 components of the matrices obtained by sub-sampling to 8×8 the result of the convolution of the image to be classified with a fixed eigenpaxel. At its output the network "activates", i.e. puts into the active state, only that neuron corresponding to the image class to be recognized which is closest to that relative to the input matrix, to also provide the difference from the reference sample of that class. Hence K RBF neural networks are obtained, each specialized for a particular eigenpaxel of the Ks considered.

The distance defined within this N-dimensional space is based on the L1 rule, i.e.

$$d_{L1} = \sum_{i=1}^{N} |Vi - Pi|.$$

where V and P are two vectors and i is the index which traverses the N space dimensions.

The rule L1 is hence simply the sum of the absolute values of the differences between the homologous components of two vectors. In a two-dimensional case, the assembly of the points at a distance L1 from a predetermined vector P is represented by the perimeter of a square rotated through 45° about the coordinate axes and centered on the point P itself.

Another difference between this and traditional networks is the manner in which the extinction radius of each neuron is determined from the images used in the network learning stage.

The neural network is instructed in supervised mode, as commonly defined: i.e. the neural network is instructed by an assembly of samples form which the pertaining category is also indicated, for example in our case we can consider the neural network associated with the first filter (corresponding to the first eigenpaxel). For each person we provide the network with five images which are then filtered with the filter derived from the first autopaxel, they then being rescaled to an 8×8 format which constitutes the 64 dimension spatial vector identifying that particular image. For the first neural network we thus have 5 neurons for each person. The centre of each neuron is determined from the previously described 64 dimension vector while the extinction radius of each neuron is determined such as to occupy the greatest available space without interfering with the extinction radii of neurons pertaining to other categories (otherwise the intersection between spheres determined by the two neurons would represent a zone of uncertainty, and if the vector of the analysed person should fall within this zone the system would not know how to decide to which person the considered image pertains). The maximum extinction radius is determined by an iterative process in which all the neurons pertaining to categories different from that of the new neuron are analysed. The initial radius is chosen as the minimum distance from these neurons.

The extinction radii of all neurons pertaining to categories different from the current neuron are then progressively analysed following an order starting from the closest neuron to the farthest neuron. If the sum of these two radii exceeds the distance between the two neurons, the ensuing radius reduction criterion is applied.

If the radius of the considered neuron is greater than half the distance between the two neurons it is simply decreased by a quantity such that the sum of the radii of the two neurons is equal to the distance between them. If instead the radius of the neuron pertaining to the other category exceeds half the distance between the two neurons, then if the radius of the current neuron is greater than half this distance the radii of both the neurons are reduced such that they become equal to half the distance between the two neurons, otherwise only the radius of the neuron of the other category is reduced so that their sum coincides with the distance between the two neuron centres.

This process of reducing the extinction radii can be summarized in the following manner. A new neuron is initialized with an assigned centre. The neurons pertaining to the other categories are arranged in an order increasing with their distances from the centres.

The radius of the new neuron is initialized as the distance from the closest neuron. The progressive reduction process is commenced to prevent superposing of the spheres (avoiding uncertainty in classification).

If the current neuron intersects the volume of another neuron, the radius of the new neuron is examined to determine if it is greater than half the distance between the two neurons, otherwise the next neuron is examined to again determine if the current neuron intersects the volume of another neuron.

If the radius of the new neuron is greater than half the distance between the two neurons, the radius of the new neuron is reduced to one half the distance between the two neurons. If they still intersect, the radius of the second neuron is reduced until it becomes tangential to the new neuron. The next neuron is then considered to determine whether the current neuron intersects the volume of another neuron.

If the radius of the new neuron is less than half the distance between the two neurons, the radius of the other neuron is reduced to make it tangential to the new neuron. The next neuron is then considered to again determine if the current neuron intersects the volume of another neuron.

On termination of this process, there will be no more intersections between spheres pertaining to neurons of different categories (whereas neurons pertaining to the same category, i.e. to the same person, are allowed to intersect).

For each image used to instruct the neural network the previously described process is carried out on each of the filters used; each filter acts on a different neural network. To test the operation of this process, five 256 grey tone image for each person were used. The images were frontal and the face, which must be completely framed, must occupy more than ⅔ of the image. During the recognition stage the system is provided with a new image of an unknown person, also of 256 grey tones and with the same characteristics as the images used for instructing the network.

The system filters and rescales the image with the six previously described filters (the six eigenpaxels associated with the major autovalues) and then sets the six 64 dimension vectors obtained in this manner into the six different spaces (each of which pertains to a different class) of the six neural networks.

The inserted image of the unknown person is recognized only if its vector pertains to an N-dimensioned sphere defined by the centre and radius of a previously inserted image.

Specifically, the following three different cases can occur: In all the six neural networks used, the vectors obtained fall outside the spheres of all the neurons. In that case the person is identified as "not recognized".

In one or more of the neural networks the vectors fall within neurons indicating the same category (i.e. identifying the same person) whereas in the other networks they fall outside the radius of influence of all the neurons. In that case the person is identified as that indicated by the category of the neurons which have recognized it.

The different neural networks give conflicting indications about the person to whom the photograph pertains. In this latter case the method described hereinafter is followed.

If there are conflicting indications on the identity of a person from the different neural networks, a weighted sum of the indications from each network is evaluated.

Only those neural networks in which the vector obtained falls within a sphere of influence will be considered.

The distance of the vector from the centre of the closest neuron is evaluated by rule L1. This distance is weighted by the Mahalanobis criterion: each eigenpaxels is given a particular eigenvalue, this value being in reality an index of the variance (the degree of reliability of the information) possessed by the analysed data in the direction indicated by the eigenpaxel. The distance obtained is then divided by the square root of the eigenvalue corresponding to the eigenpaxel considered. After this weighting, the results corresponding to the same person from the different neural networks are then added together. If the person indicated as most probable has more than double the distance of the second person who has received the second most points, the system then decides that it is able to recognize the person obtaining most points. If the said analysis does not give sufficient difference between the first and second person, the system confirms that it has not been able to recognize the framed person, who is then identified as "not recognized".

The invention claimed is:

1. A method for recognition between a first object and a second object represented by at least one first image and at least one second image, each containing a plurality of pixels, comprising the following steps:

defining a plurality of randomly positioned rectangular array of pixels;

filtering by the mathematical operation of bi-dimensional matrix convolution of said first image with the first n matrices obtained from said randomly positioned rectangular array of pixels to obtain n first filtered matrices;

classifying said n first filtered matrices by providing a first centre and a first radius within a space of N dimensions, for each of said n first filtered matrices, said first radius and said first centre representing n first hyperspheres within a space of N dimensions;

filtering by the mathematical operation of bi-dimensional matrix convolution of said second image with the first n matrices obtained from said randomly positioned rectangular array of pixels to obtain n second filtered matrices;

classifying said n second filtered matrices by providing a second centre within said space of N dimensions, for each of said n second filtered matrices;

comparing said first centre and said first radius of each of said first filtered matrices with said second centre for each of said n second filtered matrices; and considering that recognition between said first object and said second object has taken place if at least one said second centre lies at a distance from said first centre which is less than or equal to at least one said first radius, wherein an inserted image of an unknown object is recognized only if a vector of the unknown object pertains to an N-dimensional sphere defined by the centre and radius of a previously inserted image.

2. The method as claimed in claim 1, further comprising: inserting a third object represented by at least one third image;

providing a third radius within said space of N dimensions; and dimensioning said third radius such that it does not interfere with said first radius.

3. The method as claimed in claim 1, wherein the step of classifying said n first and second filtered matrices takes place by using a RBF (radial basis function) neural network.

4. The method as claimed in claim 3, wherein said RBF (radial basis function) neural network comprises only one input layer and only one output layer.

5. The method as claimed in claim 1, further comprising the step of rescaling said first and second filtered matrices, by reducing their size by means of a bilinear interpolation.

6. The method as claimed in claim 1, wherein said objects are faces of individuals.

7. The method as claimed in claim 1, wherein said phases of classifying are carry out by decreasing values of the relative eigenvalues derived from the correlation matrix of said rectangular pixel assemblies.

8. The method as claimed in claim 1, further comprising the step of classifying said n second filtered matrices by providing a second radius and a second centre within said space of N dimensions, for each of said n second filtered matrices; said first radius and said first centre representing n first hyperspheres within a space of N dimensions, said second radius and said second centre representing n second hyperspheres within a space of N dimensions, recognition between said first object and said second object being considered to have taken place if there is interference between at least one of said first hyperspheres and at least one of said second hyperspheres.

9. The method as claimed in claim 1, wherein the step of classifying said n first and second filtered matrices takes place by using six RBF (radial basis function) neural networks, and if the vectors obtained fall outside spheres of all neurons, the object is identified as not recognized.

10. The method as claimed in claim 1, wherein in one or more of the neural networks the vectors fall within neurons indicating a same category identifying the same object, whereas in other neural networks the vectors fall outside a radius of influence of all the neurons, whereby corresponding object is identified as that indicated by the category of the neurons which have recognized the corresponding object.

11. The method as claimed in claim 1, wherein if different neural networks give conflicting indications about the object to whom the photograph pertains, a weighted sum of the indications from each network is evaluated.

12. The method as claimed in claim 1, wherein if different neural networks give conflicting indications about the object to whom the photograph pertains, only those neural networks in which the vector obtained falls within a sphere of influence will be considered.

13. A method for recognition between a first object and a second object represented by at least one first image and at least one second image, each containing a plurality of pixels, comprising the following steps:

defining a plurality of randomly positioned rectangular array of pixels;

filtering by the mathematical operation of bi-dimensional matrix convolution of said first image with the first n matrices obtained from said randomly positioned rectangular array of pixels to obtain n first filtered matrices;

classifying said n first filtered matrices by providing a first centre and a first radius within a space of N dimensions, for each of said n first filtered matrices, said first radius and said first centre representing n first hyperspheres within a space of N dimensions;

filtering by the mathematical operation of bi-dimensional matrix convolution of said second image with the first n matrices obtained from said randomly positioned rectangular array of pixels to obtain n second filtered matrices;

classifying said n second filtered matrices by providing a second centre within said space of N dimensions, for each of said n second filtered matrices;

comparing said first centre and said first radius of each of said first filtered matrices with said second centre for each of said n second filtered matrices; and considering that recognition between said first object and said second object has taken place if at least one said second centre lies at a distance from said first centre which is less than or equal to at least one said first radius, wherein the steps of classifying said n first and second filtered matrices takes place by using a RBF (radial basis function) neural network, and a distance of a vector from a centre of a closest neuron of said neural network is evaluated by rule L1:

$$d_{L1} = \sum_{i=1}^{N} |Vi - Pi|$$

where V and P are two vectors, and I is an index which traverses the N space dimensions.

14. The method according to claim 13, wherein the distance of the vector from the centre of the closest neuron is evaluated such that each eigenpaxel is given a particular eigenvalue which is an index of variance possessed by the analyzed data in a direction indicated by the eigenpaxel.

15. The method according to claim 14, wherein the distance of the vector from the centre of the closest neuron is divided by a square root of the eigenvalue corresponding to the eigenpaxel considered.

16. The method according to claim 15, wherein results corresponding to a same object from different neural networks are added together, and the object indicated as most probable has more than double the distance from a second object that has received a second most points, the object having the most points is recognized.

17. The method as claimed in claim 13, further comprising:
   inserting a third object represented by at least one third image;
   providing a third radius within said space of N dimensions; and
   dimensioning said third radius such that it does not interfere with said first radius.

18. The method as claimed in claim 13, wherein said RBF (radial basis function) neural network comprises only one input layer and only one output layer.

19. The method as claimed in claim 13, further comprising the step of rescaling said first and second filtered matrices, by reducing their size by means of a bilinear interpolation.

20. The method as claimed in claim 13, wherein said objects are faces of individuals.

* * * * *